(12) United States Patent
Fann et al.

(10) Patent No.: US 8,711,107 B2
(45) Date of Patent: Apr. 29, 2014

(54) SIGNAL CONVERSION CONTROL CIRCUIT FOR TOUCH SCREEN AND METHOD THEREOF

(75) Inventors: Kee Lih Fann, Hsinchu County (TW); Fang Zhang, Wuhan (CN)

(73) Assignee: Myson Century, Inc., Hsinchu (TW)

( * ) Notice: Subject to any disclaimer, the term of this patent is extended or adjusted under 35 U.S.C. 154(b) by 922 days.

(21) Appl. No.: 12/426,573

(22) Filed: Apr. 20, 2009

(65) Prior Publication Data

US 2010/0103120 A1 Apr. 29, 2010

(30) Foreign Application Priority Data

Oct. 29, 2008 (TW) .............................. 97141533 A

(51) Int. Cl.
*G06F 3/041* (2006.01)

(52) U.S. Cl.
USPC ......................................................... 345/173

(58) Field of Classification Search
USPC ......................................................... 345/173
See application file for complete search history.

(56) References Cited

U.S. PATENT DOCUMENTS

| | | | | |
|---|---|---|---|---|
| 5,903,250 | A * | 5/1999 | Lee et al. ....................... | 345/100 |
| 6,243,066 | B1 * | 6/2001 | Murakami et al. .............. | 345/98 |
| 6,246,394 | B1 * | 6/2001 | Kalthoff et al. ................ | 345/173 |
| 6,700,391 | B2 * | 3/2004 | Strack et al. ................... | 324/662 |
| 6,961,015 | B2 * | 11/2005 | Kernahan et al. .............. | 341/165 |
| 7,541,954 | B2 * | 6/2009 | Min ................................ | 341/122 |
| 7,595,831 | B2 * | 9/2009 | Kameshima et al. .......... | 348/308 |
| 2002/0089491 | A1 * | 7/2002 | Willig ............................ | 345/173 |
| 2003/0090400 | A1 * | 5/2003 | Barker .......................... | 341/144 |
| 2004/0212527 | A1 * | 10/2004 | Hanna ............................ | 341/155 |
| 2007/0001939 | A1 * | 1/2007 | Hashimoto et al. ............. | 345/76 |
| 2007/0139390 | A1 * | 6/2007 | Chen ............................. | 345/173 |
| 2007/0200831 | A1 * | 8/2007 | Wang ............................ | 345/173 |
| 2007/0257890 | A1 * | 11/2007 | Hotelling et al. ............. | 345/173 |
| 2007/0262966 | A1 * | 11/2007 | Nishimura et al. ........... | 345/173 |
| 2008/0129571 | A1 * | 6/2008 | Min ............................... | 341/155 |

FOREIGN PATENT DOCUMENTS

| TW | 507158 | 10/2002 |
|---|---|---|
| TW | I283107 | 6/2007 |
| TW | 200824296 | 6/2008 |

OTHER PUBLICATIONS

Taiwanese Office Action dated Oct. 28, 2011 for 097141533, which is a corresponding Taiwanese application, that cites TW200824296, TWI283107, TW507158 and US6961015.

* cited by examiner

*Primary Examiner* — Amare Mengistu
*Assistant Examiner* — Sarvesh J Nadkarni
(74) *Attorney, Agent, or Firm* — WPAT, P.C.; Anthony King; Kay Yang

(57) ABSTRACT

A signal conversion control circuit comprises an analog-to-digital converter, a first sample-and-hold circuit, a second sample-and-hold circuit, a first switch, a second switch, a third switch, and a fourth switch. The analog-to-digital converter has an input end for receiving an output signal of a touch screen. The first sample-and-hold circuit is configured to provide the analog-to-digital converter with a high-level reference voltage. The second sample-and-hold circuit is configured to provide the analog-to-digital converter with a low-level reference voltage. The first switch connects a supplied voltage to the touch screen. The second switch connects the touch screen to a ground potential. The third switch connects the supplied voltage to the first sample-and-hold circuit through the first switch. The fourth switch connects the ground potential to the second sample-and-hold circuit through the second switch.

7 Claims, 6 Drawing Sheets

SIGNAL CONVERSION CONTROL CIRCUIT FOR TOUCH SCREEN AND METHOD THEREOF

BACKGROUND OF THE INVENTION

1. Field of the Invention

The present invention relates to a touch screen, and more particularly, to a signal conversion control circuit applied to a touch screen and the method thereof.

2. Description of the Related Art

A touch screen is a display control apparatus, which can detect touch positions and touch strength from a user. Because the control method of the touch screen is more intuitive than that of a normal mouse and keyboard, it provides an easier use of a computer operational interface for non-traditional users. Therefore, most early applications of touch screens have been in public service devices, e.g., computer-assisted instruction (CAI) terminals, demo display and ATM machines, as a laborless machine. With the progress of the technology, people have more demands in intuitive machines than ever, and therefore the touch screens are more widely used on mobile machines, such as mobile telephones, personal digital assistants, and handheld game machines.

There are a variety of detection methods for a touch screen. Generally, the detection methods include resistor-type, capacitor-type, infrared-type optical-type, and others. The resistor-type touch screen determines the touch positions or touch strength in accordance with the resistor voltage divider on the touch screen. In addition, in light of the resistor and wiring arrangement, the resistor-type touch screen can be divided into four-wired, five-wired to eight-wired designs.

FIG. 1 shows a traditional signal conversion control circuit applied to a resistor-type touch screen. The signal conversion control circuit 100 is connected to a touch screen 500, and includes an analog-to-digital converter (ADC) 102, a first switch 104, a second switch 106 and a sample-and-hold circuit 108. The touch screen 500 can be a four-wired or five-wired resistor-type touch screen, and includes resistors 502, 504 and 506. The first switch 104 connects a supplied voltage to the resistor 502. The second switch 106 connects a ground potential to the resistor 504. The resistor 506 connects the resistors 502 and 504 to the input terminal of the sample-and-hold circuit 108. The input terminal of the ADC 102 is connected to the output terminal of the sample-and-hold circuit 108, while the high-level reference voltage terminal thereof is connected to the supplied voltage and the low-level reference voltage terminal is connected to the ground potential.

In a sampling mode, the first switch 104 and the second switch 106 are turned on to connect the supplied voltage and ground potential to the touch screen 500. The touch screen 500 generates a divided voltage of the supplied voltage as an output signal through a voltage divider formed by the resistors 502 and 504. After the output signals are completely sampled through the third sample-and-hold circuit 108, the flow enters a signal translation mode. In the meantime, the first switch 104 and the second switch 106 are turned off. The ADC 102 converts the sampled-and-held output signals of the touch screen 500 in accordance with the sampled-and-held supplied voltage and ground potential connected by the high-level and low-level reference voltage terminals.

In the signal conversion mode, the first switch 104 and the second switch 106 are turned off, and the current flowing through the touch screen 500 in the sampling mode can be reduced. The resistance combined by the resistors 502 and 504 is approximately in the range of 200 to 900 ohms, and the supplied voltage is approximately 5 volts. Therefore, about 5.6 to 25 mA current can be reduced. However, the voltage across a turned-on first switch 104 and a turned-on second switch 106 is about 0.3 volts, therefore, the maximal output signal of the touch screen is limited to 4.7 volts. In considering that the difference of the high-level and low-level reference voltages is about 5 volts, the accuracy of the signal conversion for the ADC 102 is significantly affected.

FIG. 2 shows another traditional signal conversion control circuit applied to a resistor-type touch screen. The signal conversion circuit 200 is connected to the touch screen 500, and includes an analog-to-digital converter (ADC) 202, a first switch 204, a second switch 206 and a sample-and-hold circuit 208. The first switch 204 connects a supplied voltage to the resistor 502 and a high-level reference voltage terminal of the ADC 202. The second switch 206 connects a ground potential to the resistor 504 and a low-level reference voltage terminal of the ADC 202. The resistor 506 connects the junction between the resistors 502 and 504 to the input terminal of the sample-and-hold circuit 208. The signal input terminal of the ADC 202 is connected to the output terminal of the sample-and-hold circuit 208.

In the sampling mode, the first switch 204 and the second switch 206 are turned on to connect the supplied voltage and ground potential to the touch screen 500. The touch screen 500 uses the divider circuit formed by the resistors 502 and 504 to generate a divided voltage of the supplied voltage as the output signal thereof. After the sample-and-hold circuit 208 completes the sample-and-hold action on the output signals, the flow enters a signal conversion mode. Meanwhile, the first switch 204 and the second switch 206 are still turned on, and the ADC 202 converts the sampled signals in accordance with the supplied voltage and ground potential connected by the high-level and low-level reference voltage terminals.

As shown in FIG. 2, the range of input signals of the ADC 202 is almost the same as the voltage difference between the high-level and low-level reference voltages, about 4.7 volts. Therefore, there is no accuracy problem when the signal conversion control circuit 100 performs. However, in the signal conversion mode, the first switch 204 and the second switch 206 are still turned on, and the current flowing through the touch screen 500 is about 5.6 mA to 25 mA, significantly increasing the power consumption of the signal conversion control circuit 200.

Therefore, it is necessary to design a signal conversion control circuit applied to the resistor-type touch screen which is capable of retaining the advantages of the above two prior arts and also removing the drawbacks of the same two prior arts.

SUMMARY OF THE INVENTION

The present invention provides a signal conversion control circuit applied to a touch screen. The signal conversion control circuit comprises an analog-to-digital converter, a first sample-and-hold circuit, a second sample-and-hold circuit, a first switch, a second switch, a third switch and a fourth switch. The analog-to-digital converter has an input end for receiving an output signal of a touch screen. The first sample-and-hold circuit is configured to provide the analog-to-digital converter with a high-level reference voltage. The second sample-and-hold circuit is configured to provide the analog-to-digital converter with a low-level reference voltage. The first switch connects a supplied voltage to the touch screen. The second switch connects the touch screen to a ground potential. The third switch connects the supplied voltage to the first sample-and-hold circuit through the first switch. The fourth switch connects the ground potential to the second sample-and-hold circuit through the second switch.

The present invention provides a signal conversion control circuit applied to a touch screen. The signal conversion control circuit comprises a first switch, a second switch, an analog-to-digital converter and a sample-and-hold circuit. The first switch connects a supplied voltage to the touch screen. The second switch connects the touch screen to a ground potential. The analog-to-digital converter has a high-level reference voltage terminal connected to the supplied voltage and a low-level reference voltage terminal connected to the ground potential. The sample-and-hold circuit is configured to provide the analog-to-digital converter with sampled signals of the supplied voltage, the ground potential and an output signal of the touch screen.

The present invention provides a method for controlling signal conversion of a touch screen, the method comprising the steps of: sampling and holding a supplied voltage of the touch screen; sampling and holding a ground potential of the touch screen; and converting an analog output signal into a digital output signal according to the sampled-and-held supplied voltage and ground potential.

The present invention provides a method for controlling signal conversion of a touch screen, the method comprising the steps of: converting a maximal value of analog output signals of the touch screen into a maximal digital signal; converting a minimal value of analog output signals of the touch screen into a minimal digital signal; converting the analog signals into digital signals; and adjusting the digital signals according to the maximal digital signal and the minimal digital signal.

BRIEF DESCRIPTION OF THE DRAWINGS

The invention will be described according to the appended drawings in which.

PREFERRED EMBODIMENT OF THE PRESENT INVENTION

Figure 1:
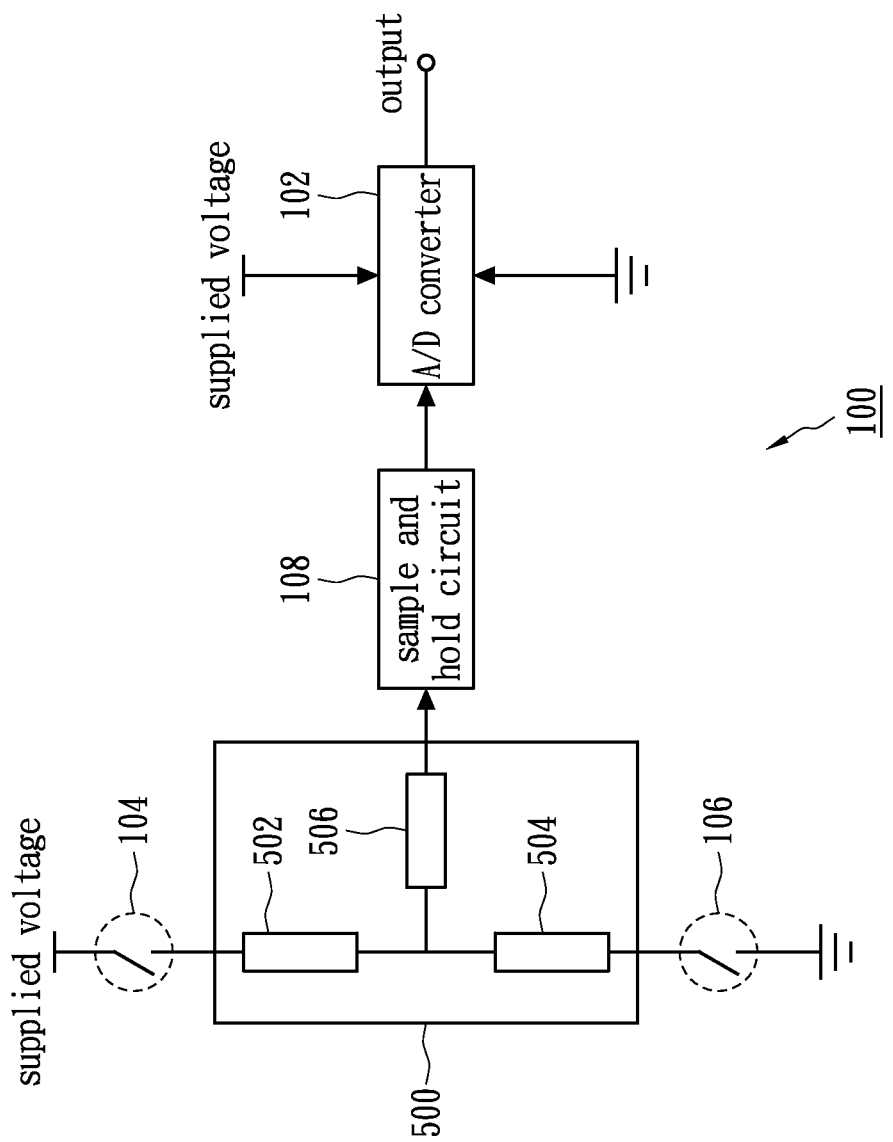
FIG. 1 shows a traditional signal conversion control circuit applied to a resistor-type touch screen.
Figure 2:
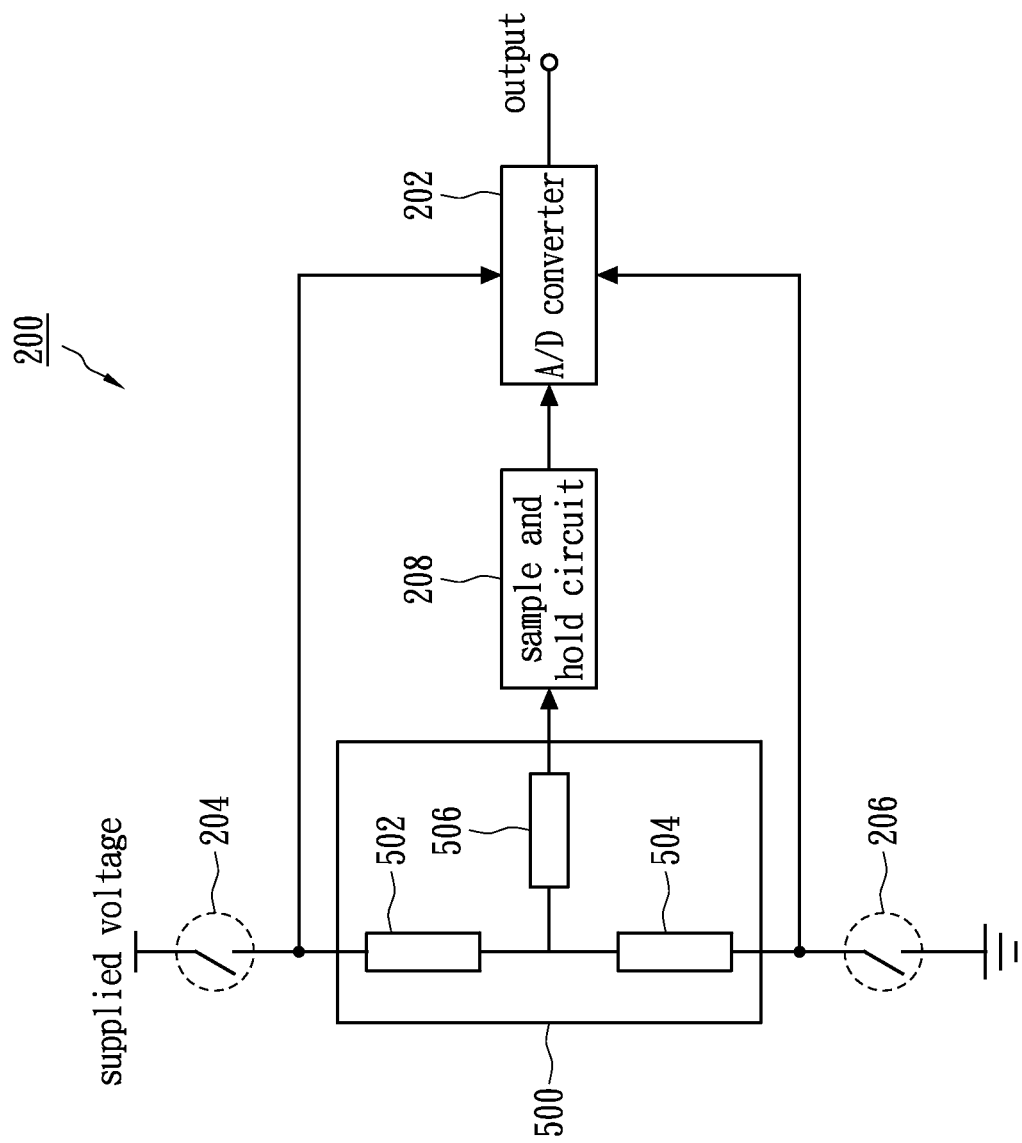
FIG. 2 shows another traditional signal conversion control circuit applied to a resistor-type touch screen.
Figure 3:
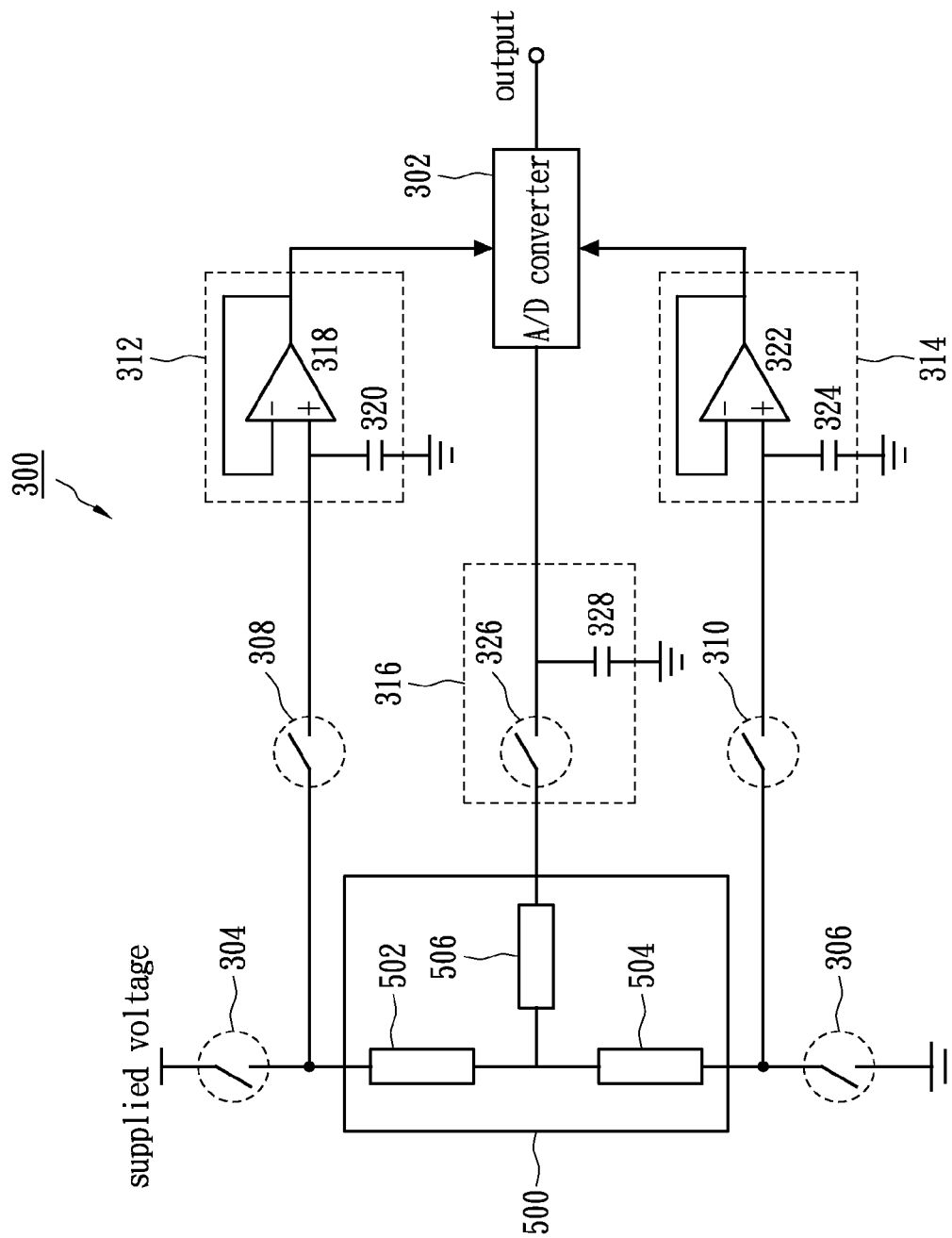
FIG. 3 shows a signal conversion control circuit in accordance with one embodiment of the present invention.

FIG. 3 shows a signal conversion control circuit in accordance with one embodiment of the present invention. The signal conversion control circuit 300 is connected to the touch screen 500, and includes an analog-to-digital converter (ADC) 302, a first switch 304, a second switch 306, a third switch 308, a fourth switch 310, a first sample-and-hold circuit 312, a second sample-and-hold circuit 314 and a third sample-and-hold circuit 316. The touch screen 500 can be a four-wire or a five-wire resistor-type touch screen, which includes resistors 502, 504 and 506. The first switch 304 connects a supplied voltage to the resistor 502. The second switch 306 connects a ground potential to the resistor 504. The third switch 308 connects the supplied voltage to the first sample-and-hold circuit 312 through a first switch 304. The fourth switch 310 connects the ground potential to the second sample-and-hold circuit 314 through the second switch 306. The resistor 506 connects the junction of the resistors 502 and 504 to the input terminal of the third sample-and-hold circuit 316. The signal input terminal of the ADC 302 is connected to the output terminal of the third sample-and-hold circuit 316, wherein the high-level reference voltage terminal is connected to the output of the first sample-and-hold circuit 312, and the low-level reference voltage terminal is connected to the output of the second sample-and-hold circuit 314.

In this embodiment, both the first sample-and-hold circuit 312 and the second sample-and-hold circuit 314 are implemented by an operational amplifier and a capacitor, wherein the first sample-and-hold circuit 312 includes a first operational amplifier 318 and a capacitor 320, and the second sample-and-hold circuit 314 includes a second operational amplifier 322 and a capacitor 324. The non-inverting input terminal of the first operational amplifier 318 is connected to the third switch 308 and the capacitor 320, the inverting input terminal of the first operational amplifier 318 is connected to the output end thereof, and the output end is connected to the high-level reference voltage terminal of the ADC 302. The non-inverting input terminal of the second operational amplifier 322 is connected to the fourth switch 310 and the capacitor 324, the inverting input terminal of the second operational amplifier 322 is connected to the output end thereof, and the output end is connected to the low-level reference voltage terminal of the ADC 302. The third sample-and-hold circuit 316 includes a fifth switch 326 and a capacitor 328.

In a sampling mode, the first switch 304, the second switch 306, the third switch 308 and the fourth switch 310 are turned on to connect the supplied voltage and ground potential to the touch screen 500. The touch screen 500 generates a divided voltage of the supplied voltage as an output signal through a voltage divider formed by the resistors 502 and 504, where the output signal includes information associated with touch positions on the touch screen. After the output signals are completely sampled through the third sample-and-hold circuit 316, the flow enters a signal translation mode as soon as the capacitor 320 is charged by the supplied voltage and the capacitor 324 is charged through the ground potential. In the meantime, the first switch 304, the second switch 306, the third switch 308 and the fourth switch 310 are turned off. The first operational amplifier 318 outputs voltage based on the capacitor 320. The second operational amplifier 322 outputs voltage based on the capacitor 324. The ADC 302 converts the sampled-and-held output signals of the touch screen 500 in accordance with the sampled-and-held supplied voltage and ground potential connected by the high-level and low-level reference voltage terminals.

In the signal conversion mode, the first switch 304, the second switch 306, the third switch 308 and the fourth switch 310 are turned off, and thus the current flowing through the touch screen 500 in the sampling mode can be reduced. In addition, the embodiment implements the input circuit and output circuit of the first operational amplifier 318 by an N-type transistor, and implements the active load of the first operational amplifier 318 by a P-type transistor, so that the first operational amplifier 318 can provide an output voltage close to the supplied voltage when operating at the voltage close to the supplied voltage. Similarly, the embodiment implements the input circuit and output circuit of the second operational amplifier 322 by a P-type transistor, and implements the active load of the second operational amplifier 322 by an N-type transistor, so that the second operational amplifier 322 can provide an output voltage close to the ground potential when operating at the voltage close to the ground potential. In another aspect, the current flowing through the third switch 308 and the fourth switch 310 is small, thereby causing only a slight drop in voltage. In this embodiment, the voltage drop caused by the third switch 308 and the first operational amplifier 318 and the voltage drop caused by the fourth switch 310 and the second operational amplifier 322 are about 1.5 mV. Therefore, the range of input signals of the ADC 302 is about 4.7 volts with a variation of about 3 mV. As a result, the problem of inaccuracy in signal conversion can be resolved.

Figure 4:
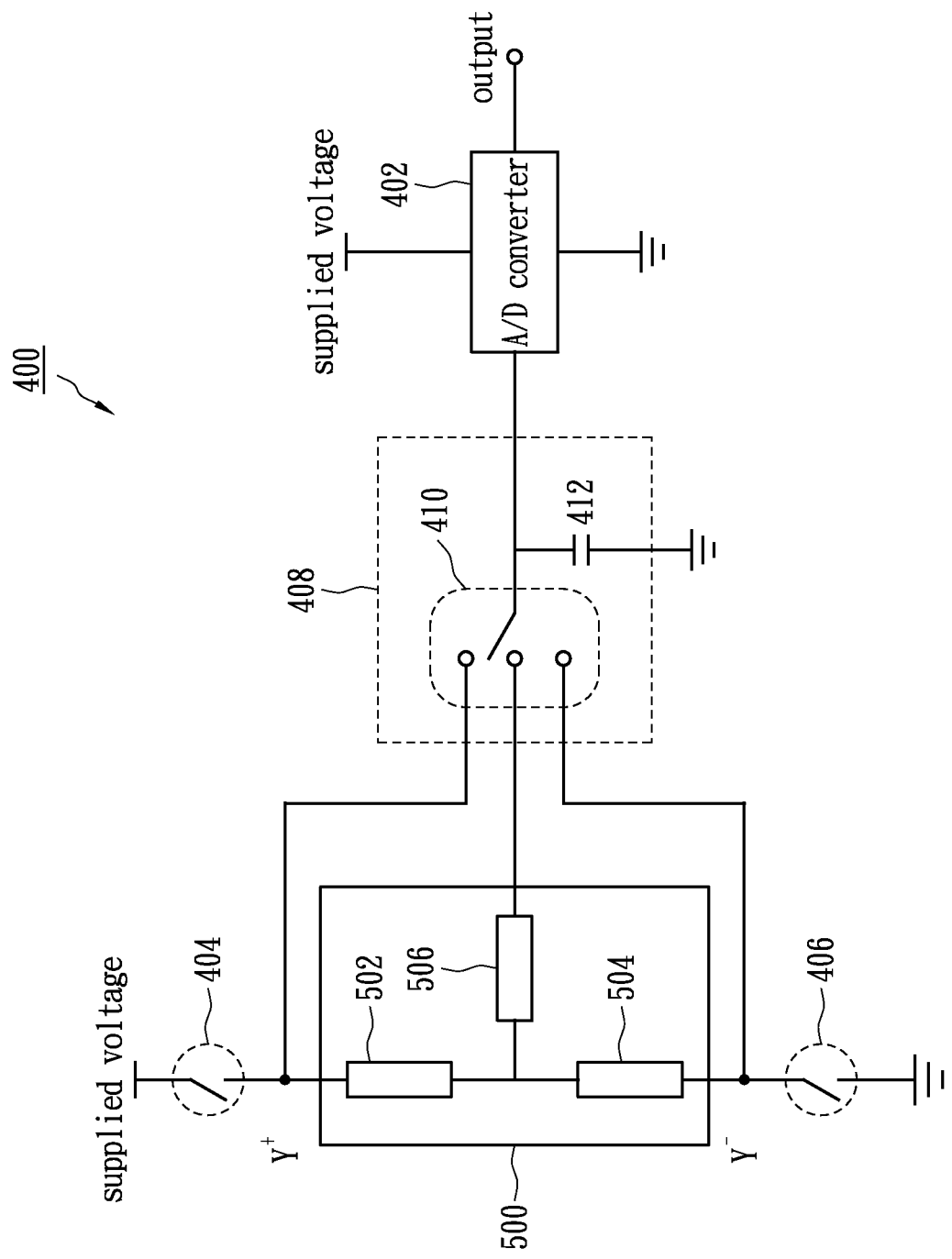
FIG. 4 shows a signal conversion control circuit applied to a touch screen in accordance with another embodiment of the present invention.

FIG. 4 shows a signal conversion control circuit applied to a touch screen in accordance with another embodiment of the present invention. The signal conversion control circuit 400 is connected to the touch screen 500, and includes an ADC 402, a first switch 404, a second switch 406 and a sample-and-hold circuit 408. The first switch 404 connects a supplied voltage to the touch screen 500. The second switch 406 connects the touch screen 500 to a ground potential. The high-level reference voltage terminal of the ADC 402 is connected to the supplied voltage, while the low-level reference voltage terminal of the ADC 402 is connected to the ground potential. The sample-and-hold circuit 408 includes a third switch 410 and a capacitor 412, and provides the ADC 402 with the sampled signals of the supplied voltage, the ground potential and one output signal of the touch screen 500.

In the sampling mode, the first switch 404 and the second switch 406 are turned on to connect the supplied voltage and ground potential to the touch screen 500. The touch screen 500 uses a voltage divider formed by the resistors 502 and 504 to generate the divided voltage of the supplied voltage as the output signals thereof, where the output signals include information about touch positions of the touch screen 500. After the sampled-and-held output signal is sent by the sample-and-hold circuit 408, the flow enters the signal conversion mode. In the meantime, the first switch 404 and the second switch 406 are turned off. The ADC 402 converts the sampled-and-held output signals in accordance with the supplied voltage and ground potential connected by the high-level and low-level reference voltage terminals.

In the signal conversion mode, the first switch 404 and the second switch 406 are turned off, thus the current flowing through the touch screen 500 can be reduced. In addition, the sample-and-hold circuit 408 further samples the voltage of the node Y+ between the first switch 404 and the touch screen 500 and samples the voltage of the node Y− between the second switch 406 and the touch screen 500. The sampled voltage Y+ and Y− affiliates the ADC 402 to improve the accuracy problem caused by the range of the input signals and the difference between the high-level and low-level reference voltages.

Figure 5:
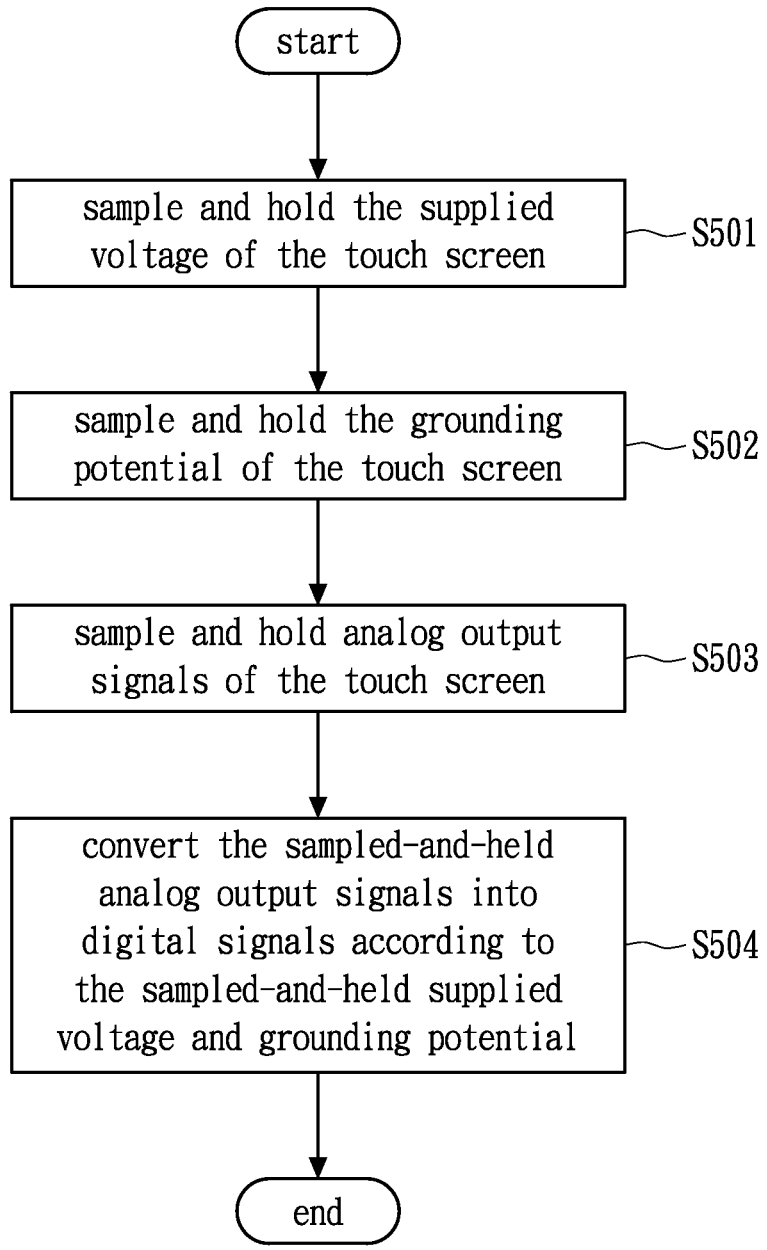
FIG. 5 shows a flow chart of sampling the output signals of the touch screen in accordance with another embodiment of the present invention.

FIG. 5 shows a flow chart of sampling the output signals of the touch screen in accordance with another embodiment of the present invention. In step S501, the supplied voltage of the touch screen is sampled and held, and the flow enters step S502. In step S502, the ground potential of the touch screen is sampled and held, and the flow enters step S503. In step S503, the analog output signals of the touch screen are sampled and held, and the flow enters step S504, where the analog output signals include information about the touch positions of the touch screen. In step S504, the sampled-and-held analog output signals are converted into a digital signal in accordance with the sampled-and-held supplied voltage and ground potential. Preferably, the sample-and-hold operation is performed by the operational amplifier and the capacitors. The sampled-and-held supplied voltage is regarded as the high-level reference voltage, and the sampled-and-held ground potential is regarded as the low-level reference voltage. In addition, the steps S501-S503 have no sequence relationship, and can be alternatively done in any order or simultaneously.

Figure 6:
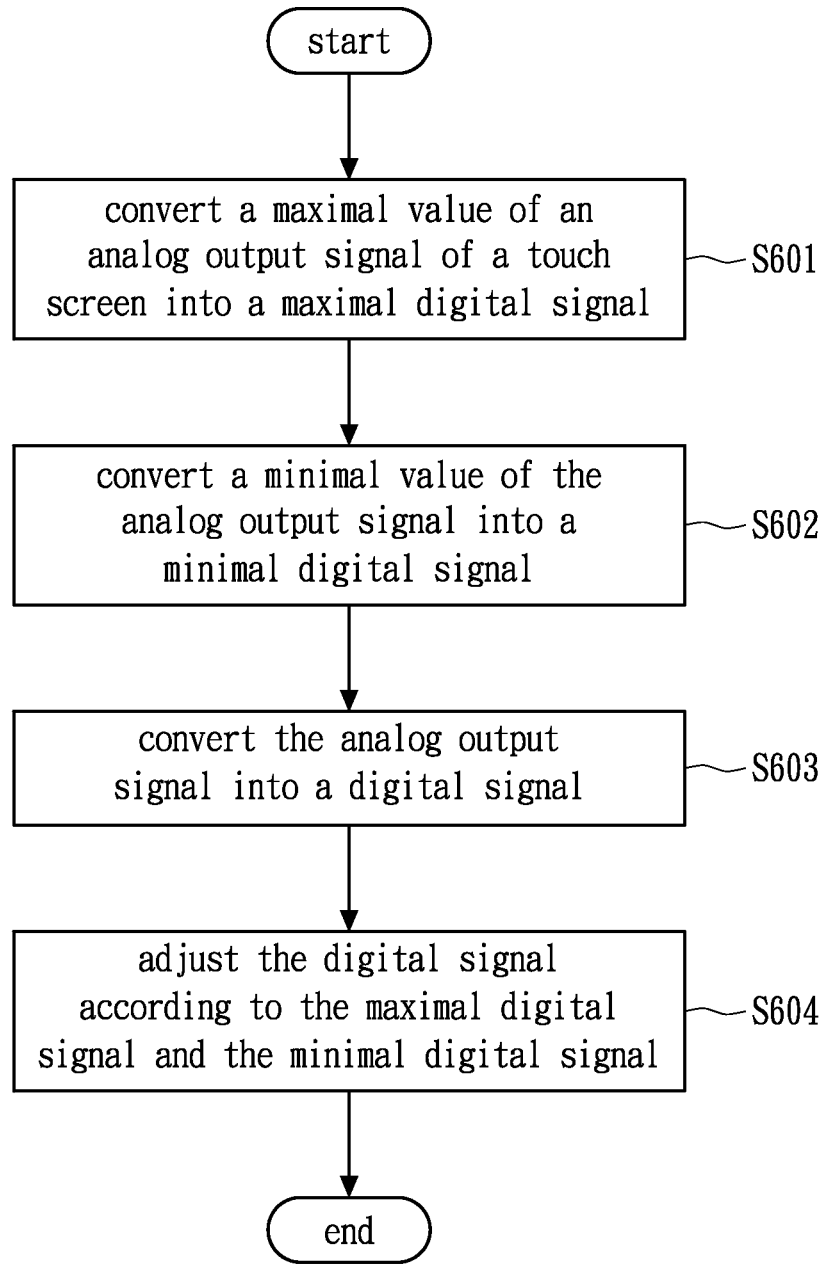
FIG. 6 shows a flow chart of sampling output signals of the touch screen in accordance with one embodiment of the present invention.

FIG. 6 shows a flow chart of sampling output signals of the touch screen in accordance with one embodiment of the present invention. In step S601, a maximal output value of analog output signals of the touch screen (corresponding to the Y+ shown in FIG. 4) is converted into a digital signal, and the flow enters step S602. In step S602, a minimal output value of analog output signals of the touch screen (corresponding to the Y− shown in FIG. 4) is converted into a digital signal, and the flow enters step S603. In step S603, the analog output signals of the touch screen are converted into a digital signal, and the flow enters step S604. In step S604, the conversion signals of the analog output signals are adjusted in accordance with the maximal and minimal converted output values. The analog output signals include information of the touch positions on the touch screen. The steps S601-S603 have no sequence relationship, and can be alternatively done in any order or simultaneously.

In conclusion, the present signal conversion control circuit and the method thereof applied to the touch screen not only reduce the current flow of the touch screen and power consumption (a simulation shows that the present invention can reduce power consumption by over 80% compared to the prior art), but also improve the accuracy of analog-to-digital conversion. Therefore, the present invention is very useful in four-wire, five-wire or other resistor-type touch screens.

The above-described embodiments of the present invention are intended to be illustrative only. Numerous alternative embodiments may be devised by persons skilled in the art without departing from the scope of the following claims.

What is claimed is:

1. A signal conversion control circuit applied to a touch screen, comprising:
    an analog-to-digital converter having an input end for receiving an output signal of a touch screen;
    a first sample-and-hold circuit configured to provide the analog-to-digital converter with a high-level reference voltage;
    a second sample-and-hold circuit configured to provide the analog-to-digital converter with a low-level reference voltage;
    a first switch connecting a supplied voltage to the touch screen;
    a second switch connecting the touch screen to a ground potential;
    a third switch connecting the supplied voltage to the first sample-and-hold circuit through the first switch; and
    a fourth switch connecting the ground potential to the second sample-and-hold circuit through the second switch;
    wherein the first sample-and-hold circuit includes a first operational amplifier and a capacitor and a non-inverting input terminal of the first operational amplifier is connected to the third switch and the capacitor, an inverting input terminal of the first operational amplifier is connected to an output terminal of the first operational amplifier, and an output terminal of the first operational amplifier is connected to a high-level reference voltage terminal of the analog-to-digital converter.

2. The signal conversion control circuit of claim 1, wherein input and output components of the first operational amplifier are implemented by an N-type transistor, and an active load of the first operational amplifier is implemented by a P-type transistor.

3. The signal conversion control circuit of claim 1, wherein the second sample-and-hold circuit includes a second operational amplifier and a capacitor.

4. The signal conversion control circuit of claim 3, wherein input and output components of the second operational amplifier are implemented by a P-type transistor, and an active load of the second operational amplifier is implemented by an N-type transistor.

5. The signal conversion control circuit of claim 3, wherein a non-inverting input terminal of the second operational amplifier is connected to the fourth switch and the capacitor, an inverting terminal of the second operational amplifier is connected to an output terminal of the second operational amplifier, and the output terminal is connected to a low-level reference voltage terminal of the analog-to-digital converter.

6. The signal conversion control circuit of claim 1, further comprising a third sample-and-hold circuit configured to provide the analog-to-digital converter with output sampled signals of the touch screen.

7. The signal conversion control circuit of claim 1, which is applied to a four-wire or a five-wire touch screen.

* * * * *